(No Model.)
A. HAARLANDER.
TEA KETTLE.
No. 302,126. Patented July 15, 1884.
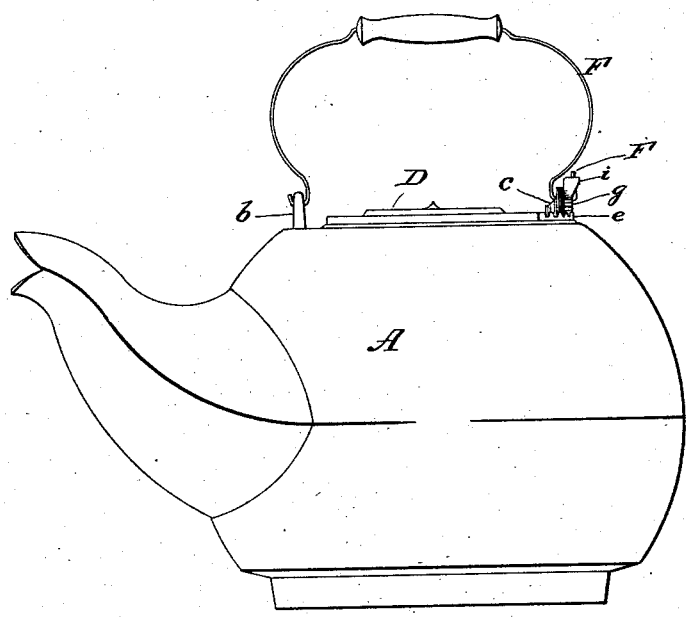
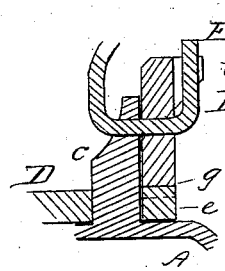
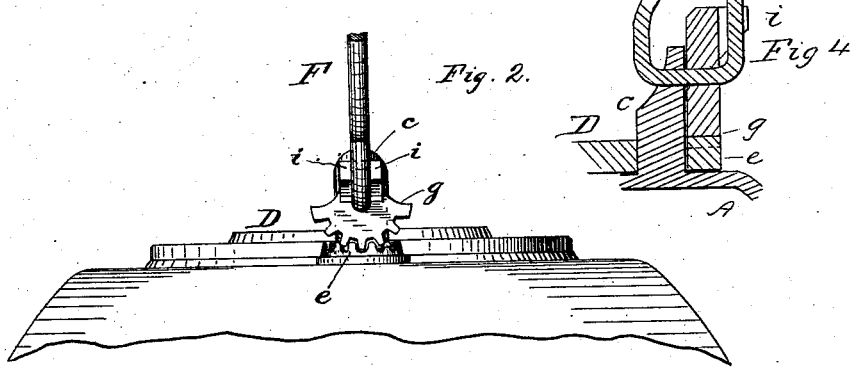
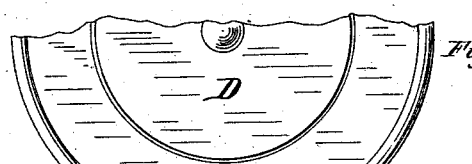
Attest:—
T. J. Patterson
Saml. Cunningham
August Haarlander.
Inventor
Connolly Bro. & McTighe
Attorneys.

UNITED STATES PATENT OFFICE.

AUGUST HAARLANDER, OF ALLEGHENY, PENNSYLVANIA.

TEA-KETTLE.

SPECIFICATION forming part of Letters Patent No. 302,126, dated July 15, 1884.

Application filed December 4, 1883. (No model.)

*To all whom it may concern:*

Be it known that I, AUGUST HAARLANDER, of Allegheny, in the county of Allegheny and State of Pennsylvania, have invented certain new and useful Improvements in Tea-Kettles; and I do hereby declare that the following is a full, clear, and exact description of the invention, which will enable others skilled in the art to which it appertains to make and use the same, reference being had to the accompanying drawings, which form a part of this specification, in which—

Figure 1 is a side elevation of my improved form of kettle. Fig. 2 is an end view, enlarged, of the lid and upper portion. Fig. 3 is a plan view of the pivotal portion of the lid. Fig. 4 is a vertical sectional view through devices shown in Fig. 3.

This invention relates to the construction of that class of domestic utensils familiarly known as "tea-kettles;" and it consists in the construction and combination of parts substantially as hereinafter fully described and claimed.

A designates the kettle, generally made of cast-iron, somewhat flattened on top, and having a central opening. On the top are formed the front bail-lug, $b$, and the rear bail-lug, $c$. The latter is, near its base, formed cylindrical, and serves also as a vertical pivot for the lid to swing horizontally upon. The lid D has the lug $e$ formed upon its rear edge, and lug $e$ has a central opening, $f$, fitting down over the bail-lug $c$. Upon the upper edge of the lug $e$, I form teeth, so that this portion of lug $e$ constitutes a pinion or crown wheel, as shown, around the point of pivotal support. After setting the bail F into place in the ears or lugs $b$ $c$, I slip onto the end which projects through lug $c$ a toothed segment, $g$, whose axis is then the horizontal portion of the bail F, which passes through it. The relative positions are such that when the segment $g$ is in place on the bail F its teeth mesh with those of the lug $e$ on lid D. The segment $g$ has on its rear face the two studs or lips $i$ $i$, forming between them a groove, into which the end of the bail F is bent, so that the segment must turn around the same axis as the bail along with the bail when the latter is moved. The result is, that in handling the kettle when full of boiling water no injury by hot steam can happen to the hands, because in lifting the handle will be vertical and the segment $g$ will hold the lid shut, while the lid D can be swung to either side by a corresponding movement of the bail F, and in such event the lid D will follow and act as a shield for the hand.

A further feature is that, since the teeth on lug $e$ do not extend all the way around the lug, the plain portion acts as a stop or limit to the movement of the bail, which is thus prevented from coming down into contact with the body of the kettle, and this feature enables me to use wooden handles on the bails of such kettles.

The fitting together of the parts is very simple. No machine-work whatever is required. The rear bail-lug and pivot, $c$, is cast, and the bail-hole may either be cored or drilled. The lid D, with its toothed lug $e$, is cast complete. The toothed segment is cast, and the whole permanently and effectually secured in proper position by the simple act of bending up the bail between the lips $i$ of the segment. The construction is therefore extremely cheap, and there is no liability to get out of order while in use.

For the purpose of filling the kettle, it is desirable to sustain it by the handle in a vertical position, and at the same time have the lid swung aside. To provide for this I make the two extreme teeth on segment $g$ longer and wider than the intermediate teeth, and I depress the untoothed or plain portion of lug $e$. By this construction, when the bail is at its lowest point, the large extreme tooth on the segment $g$ acts, as before described, to limit the movement of the bail; but in this position the teeth on lug $e$ have moved out of engagement with the segment-teeth, and the plain or depressed portion of the lug $e$ enables the lid to be swung around farther, when the bail may be raised for lifting the kettle for filling.

I claim as my invention—

The combination of kettle A, having bail-lugs $b$ and $c$, lid D, having perforated toothed lug $e$, fitting on said lug $c$, toothed segment $g$, having lips $i$, and bail F, passing through lugs $b$ $c$ and segment $g$, and between lips $i$, substantially as described.

In testimony that I claim the foregoing as my own I have hereto affixed my signature in presence of two witnesses.

AUGUST HAARLANDER.

Witnesses:
T. J. PATTERSON,
T. J. MCTIGHE.